US012030562B2

(12) United States Patent
Lippi et al.

(10) Patent No.: US 12,030,562 B2
(45) Date of Patent: Jul. 9, 2024

(54) SEMI-TRAILER FOR TRANSPORTING A LOAD TO BE MOVED

(71) Applicant: Faymonville Distribution AG, Waisswampech (LU)

(72) Inventors: Fabrizio Lippi, Borgo San Dalmazzo (IT); Francesco Froni, Borgo San Dalmazzo (IT)

(73) Assignee: Faymonville Distribution AG, Walsswampech (LU)

( * ) Notice: Subject to any disclaimer, the term of this patent is extended or adjusted under 35 U.S.C. 154(b) by 699 days.

(21) Appl. No.: 17/278,076

(22) PCT Filed: Sep. 20, 2019

(86) PCT No.: PCT/IB2019/057991
§ 371 (c)(1),
(2) Date: Mar. 19, 2021

(87) PCT Pub. No.: WO2020/058934
PCT Pub. Date: Mar. 26, 2020

(65) Prior Publication Data
US 2021/0347418 A1     Nov. 11, 2021

(30) Foreign Application Priority Data
Sep. 21, 2018   (LU) ..................... 100932

(51) Int. Cl.
*B62D 53/06* (2006.01)
*B60G 21/067* (2006.01)

(52) U.S. Cl.
CPC ......... *B62D 53/068* (2013.01); *B60G 21/067* (2013.01); *B62D 53/064* (2013.01); *B60G 2204/8304* (2013.01); *B60G 2300/042* (2013.01)

(58) Field of Classification Search
CPC .. B62D 53/068; B62D 53/064; B60G 21/067; B60G 2204/8304; B60G 2300/042
See application file for complete search history.

(56) References Cited

U.S. PATENT DOCUMENTS

| 5,375,866 A | 12/1994 | Wagner |
| 6,371,505 B1 | 4/2002 | Turner, II |
| (Continued) | | |

FOREIGN PATENT DOCUMENTS

| EP | 1584503 | 10/2005 |
| GB | 1597264 | 9/1981 |

OTHER PUBLICATIONS

International Search Report and Written Opinion of the International Searching Authority dated Oct. 24, 2019, in connection with International Application No. PCT/IB2019/057991 (15 pages).

*Primary Examiner* — Tony H Winner
(74) *Attorney, Agent, or Firm* — KLINTWORTH & ROZENBLAT IP LLP

(57) ABSTRACT

A semi-trailer for transporting a load to be moved has a wheeled front module having a right-hand front row and a left-hand front row of front bogies each provided with a respective hydraulic suspension driven by its own hydraulic cylinder; a wheeled rear module comprising a right-hand rear row and a left-hand rear row of rear bogies each provided with a respective hydraulic suspension driven by its own hydraulic cylinder; a coupling unit of the wheeled front module for the coupling to a tractor and comprising a pair of hydraulic jacks for transferring a part of the load to be moved to the tractor; a first hydraulic unit interposed between the hydraulic cylinders of the front and rear rows of bogies and configured in such a way that the sum of the instantaneous load-supporting pressures acting on the hydraulic cylinders of the right front row and of the cylinders of the left-hand rear row is equal to the sum of the (Continued)

instantaneous pressures controlling the cylinders of the left-hand front row and of the cylinders of the right rear row; and a second hydraulic unit configured to control the hydraulic jacks based on the sum of the instantaneous load-supporting pressures acting on the hydraulic cylinders of said right front row and of said left-hand front row.

8 Claims, 4 Drawing Sheets

(56) References Cited

U.S. PATENT DOCUMENTS

| | | | |
|---|---|---|---|
| 11,440,369 B2* | 9/2022 | McPherson | B60G 17/01908 |
| 2020/0122538 A1* | 4/2020 | Engelmann | B62D 55/065 |
| 2021/0231134 A1* | 7/2021 | Schlenker | B60G 21/067 |
| 2022/0258815 A1* | 8/2022 | Argenziano | B60G 17/056 |
| 2023/0112405 A1* | 4/2023 | Calchand | B60G 17/0152 |
| | | | 280/5.515 |

* cited by examiner

SEMI-TRAILER FOR TRANSPORTING A LOAD TO BE MOVED

CROSS-REFERENCE TO RELATED APPLICATIONS

This patent application claims priority from patent application in Luxembourg no. 100932 filed on 21 Sep. 2018, the entire disclosure of which is incorporated herein by reference.

TECHNICAL FIELD

The present invention relates to a semi-trailer for transporting a load to be moved.

BACKGROUND ART

For the transport of loads in general, it is known to use wheeled trailers towed by a tractor, where the possibly ballasted tractor performs a mere function of towing, or wheeled semi-trailers, where the tractor performs the dual function of towing and supporting a part of the load to be moved. In the latter case, a L-shaped arm, known as "gooseneck", is arranged between the tractor and the load-supporting plane, which is coupled, on one hand, to the tractor by means of the interposition of a fifth wheel coupling and, on the other hand, to the load-supporting frame by means of a hinge pin, which is horizontal or parallel to the load plane. The rotation of the arm about said hinge pin and then the quota part of the load discharged on the tractor is controlled by a hydraulic jack interposed between said frame and the L-shaped arm.

Both the trailers and the semi-trailers may have a continuous load plane or be made up of two transport modules, one front module and one rear module, connected to each other by an intermediate connecting structure, that often defines its own intermediate load plane. Each of the modules has its own load plane and comprises at least two adjacent rows of bogies, each with its own suspension. The intermediate structure is normally devoid of bogies.

As is known, the suspensions of the bogies can be hydraulically interconnected to each other to support the load in two different modes of transport; the first one is the mode of transport in isostatic conditions with a load bearing on three bearing points (load isostatic triangle), where all or at least part of the suspensions of the front module are connected to the same pipe to operate with the same load-supporting pressure, i.e. to define a single supporting point that supports the load like a ball joint. In the three-point isostatic condition, the frame is not subject to torsion and, in motor vehicles, a gripping of the drive wheels is ensured, even in a condition with an uneven rolling plane.

The second mode of transport is a mode of transport in the hyperstatic condition with a bearing on four bearing points. In this condition, the stability is markedly higher than that on three bearing points and therefore it is preferable when very high loads have to be transported. However, in the hyperstatic condition with a bearing on four points, the frame and especially the intermediate connecting structure, when present, are subject to high bending, but mostly to torsion actions.

To overcome these drawbacks, it is known to provide the hydraulic circuit with a hydraulic compensation unit, which is configured to ensure that the sum of the load-supporting actions along a diagonal passing through two supporting points is equal to the sum of the load-supporting actions along a diagonal passing through the other two supporting points. In fact, the compensation block makes the bearing system on four bearing points isostatic by eliminating or reducing any torsion and bending on the frame, while maintaining an acceptable vehicle stability.

The mode of transport in isostatic conditions and bearing on four points is easily implementable on trailers, but does not find application on semi-trailers due to the presence of the hydraulic jack on the gooseneck. If connected to the hydraulic circuit provided with the above mentioned hydraulic compensation block, this hydraulic jack adds, in fact, a new pressure variable generating a system, which is again hyperstatic.

For this reason, all current semi-trailers operate in a three-point isostatic mode, the hydraulic jack hydraulically being connected to the front module. However, the three-point isostatic mode considerably limits the elevation of the centre of gravity of the load to be transported with respect to the load plane, since the lateral rollover resistance is carried out practically only by the rear module.

Vehicles for transporting a load are disclosed, for example, in U.S. Pat. No. 6,371,505 B1, DE 28 09 628 A1 and EP 1 584 503 A2.

DISCLOSURE OF INVENTION

The purpose of the present invention is to provide a semi-trailer, which allows to solve the above mentioned problem in a very simple and inexpensive way, and in particular to provide a semi-trailer, which can operate in an isostatic transport mode regardless of the height of the centre of gravity of the load to be transported.

According to the present invention a semi-trailer is provided, as set forth in claim 1.

According to the present invention, a vehicle for transporting goods is also provided, as set forth in claim 8.

BRIEF DESCRIPTION OF THE DRAWINGS

The invention will now be described with reference to the accompanying drawings, illustrating a non-limiting embodiment thereof, wherein.

BEST MODE FOR CARRYING OUT THE INVENTION

Figure 1:
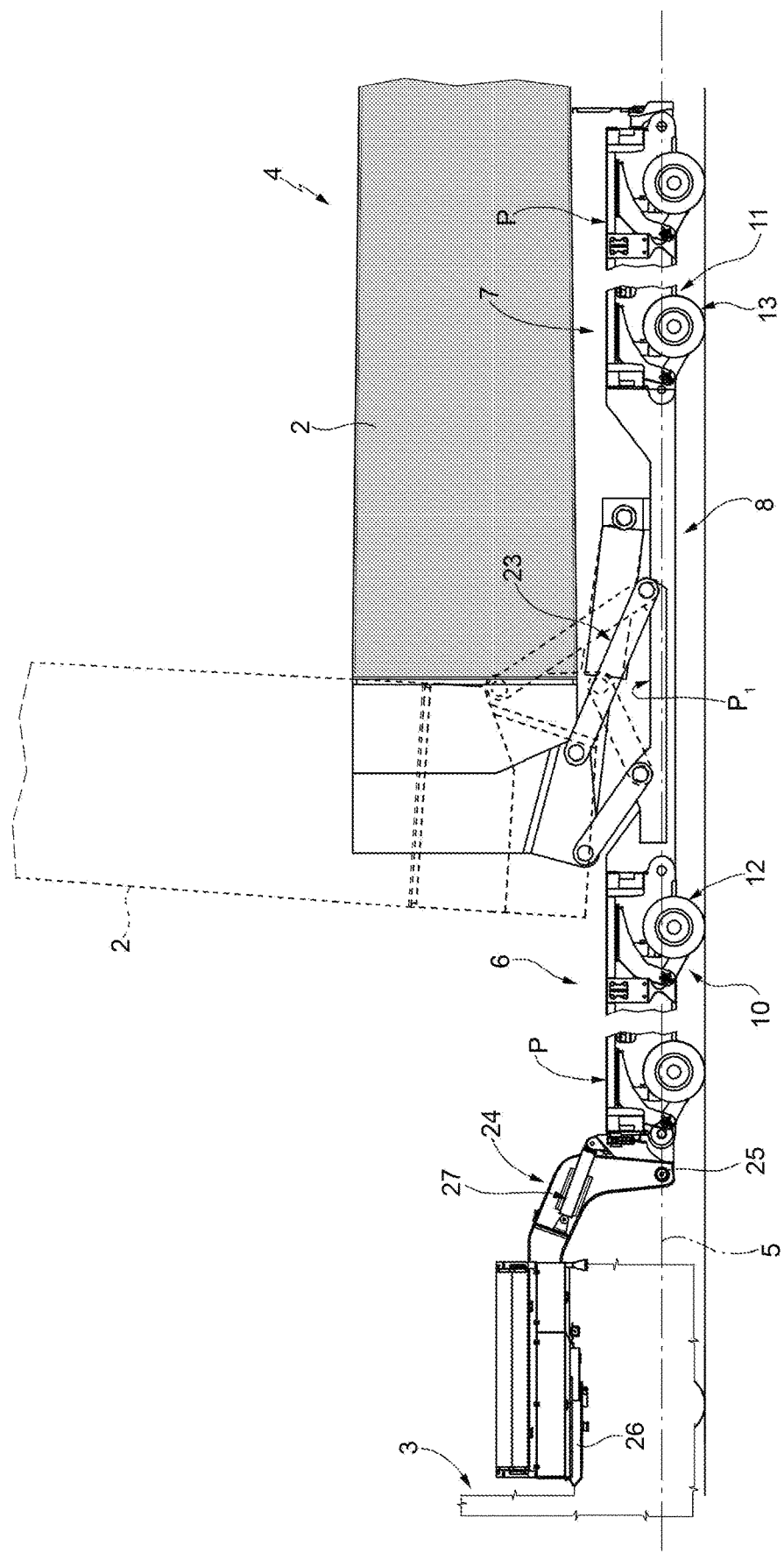
FIG. 1 shows, schematically and substantially in blocks and in a side elevation view, a preferred embodiment of a semi-trailer for transporting a load to be moved, provided according to the teachings of the present invention.
Figure 2:
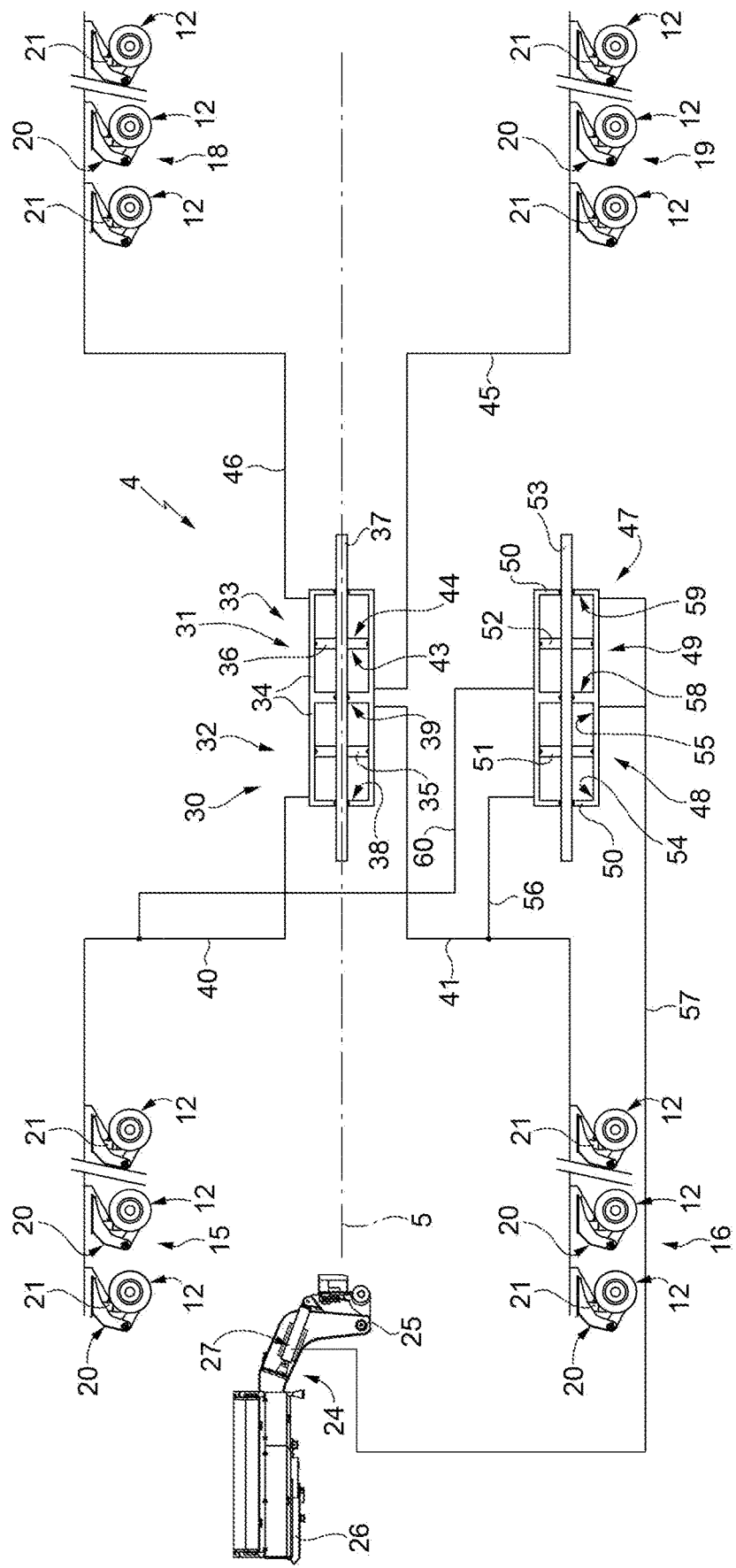
FIG. 2 shows, schematically and substantially in blocks, a hydraulic circuit to control the hydraulic suspensions of the semi-trailer of FIG. 1.

In FIGS. 1 and 2, the numeral 1 indicates, as a whole, a vehicle for transporting goods and, in particular for transporting loads extending in height, such as a wind turbine blade 2, partially illustrated, having the centre of gravity G, to which the following discussion will make explicit reference thereby without any loss of generality.

In particular, the vehicle 1 comprises a tractor 3, known per se, and a semi-trailer 4 connected to the tractor 3 in a known manner.

In the illustrated example, the semi-trailer 4 has its own longitudinal axis 5 and comprises, in the forwarding direction of the semi-trailer 4, a wheeled front module 6, a wheeled rear module 7 and an intermediate bridge structure 8 connecting the wheeled modules 6 and 7 to each other.

According to a non-illustrated variation, the semi-trailer 4 is not provided with the intermediate structure 8 and the wheeled modules 6 and 7 are directly connected to each other.

In the described example, the wheeled modules 6 and 7 have a front frame 10 and, respectively, a rear frame 11 defining respective load planes P and are firmly connected to the intermediate structure 8, preferably, but not necessarily, in a releasable manner, for example by means of hinge pins.

The front 6 and rear module 7 further comprise a plurality of front trolleys or bogies 12 coupled in a known manner to the front frame 10 and, respectively, a plurality of rear bogies 13 firmly connected to the rear frame 11 again in a known manner. The front bogies and the rear bogies 13 are distributed under the respective frames 10,11 so as to form a right-hand front row 15 and a left-hand front row 16 of front bogies 12 and, respectively, a right-hand rear row 18 and a left-hand rear row 19 of rear bogies 13. In the example shown, the front 6 and rear module 7 have the same number of bogies.

The front 12 and rear bogies 13, which are conveniently constructively identical, are provided each with its own hydraulic suspension 20, known per se, which is independent from the other hydraulic suspensions 20 and comprises a hydraulic cylinder 21 for supporting the load.

The intermediate structure 8 is a bridge structure, it is not supported by bogies and delimits a load plane P1, which is lowered with respect to the load planes P, i.e. placed at a lower height from the ground than the height of planes P. Conveniently, the load plane P1 is fifty centimetres lower than the planes P and supports a unit 23 for coupling and supporting the wind turbine blade 2 suitable to allow the rotation of the wind turbine blade 2 between two limit end positions, one of which lying on one of the two modules 6,7 and the other one tipped, in which the wind turbine blade 2 is arranged in a condition close to verticality.

The front frame 10 is coupled to the tractor 3 by means of an inverted L-shaped arm 24 known as gooseneck and having an end portion hinged to the front frame 10 by means of a horizontal pin 25 and an opposed end portion coupled to the tractor 3 by means of a fifth wheel coupling 26.

Between the front frame 10 and the arm 24 a pair of hydraulic jacks 27 is interposed, only one of which being visible in the accompanying figures, which are driven to rotate the gooseneck around the pin 12 and transfer, in a known manner, a part of the load to be transported on the tractor 3.

With reference to FIG. 2, the semi-trailer 4 also comprises a hydraulic circuit 30 to connect and control the cylinders 21 of all wheeled bogies 12,13 and of the hydraulic jacks 27. The hydraulic circuit 30 is a "autonomous" hydraulic circuit, i.e. it operates without external signals or interventions by an operator or an electronic control unit and is configured to continuously control the suspensions in such a way that the semi-trailer 4 always operates in an isostatic condition with a load bearing on five points, as will be better described below.

The hydraulic circuit 30 comprises a hydraulic distribution unit 31, which is configured in such a way that the sum of the instantaneous pressures controlling the hydraulic cylinders 21 of the right-hand front row 15 and those of the left-hand rear row 19 is equal to the sum of the instantaneous pressures controlling the hydraulic cylinders 21 of the left-hand front row 16 and the right-hand rear row 18. For this purpose, the hydraulic group 31 comprises a double-acting hydraulic cylinder 32 associated to the front module 6 and a double-acting hydraulic cylinder 33 associated with the rear module 7. The hydraulic cylinders 32 and 33 have respective liners 34 fixed relative to each other and suitably firmly connected to each other, and respective pistons 35 and 36. In the described example, the pistons 35 and 36 have the same thrust surface.

According to a variation, the pistons 35 and 36 have different thrust surfaces.

In both cases, the pistons 35 and 36 are slidable inside the respective liners 34 and are firmly connected to a common free rod 37 passing through both liners 34. The piston 35 divides the space inside the respective liner 34 thereby delimiting two front variable-volume chambers 38, 39, of which the chamber 38 is hydraulically connected through a pipe 39, to the hydraulic cylinders 21 of the bogies 12 of the right-hand front row 15 and chamber 39 is connected, by means of a pipe 41, to the hydraulic cylinders 21 of the front bogies 12 of the left-hand front row 16.

On the other hand, the piston 36 divides the space inside the respective liner 34 thereby delimiting two variable-volume rear chambers, indicated as 43 and 44. The chamber 43 is hydraulically connected, by means of a pipe 45, to the hydraulic cylinders 21 of the bogies of the left-hand row 19 of rear bogies and the chamber 44 is hydraulically connected, by means of a pipe 46, to the hydraulic cylinders 21 of the rear bogies 13 of the right-hand row of bogies 18.

Again with reference to FIG. 2, the hydraulic circuit 30 further comprises a hydraulic distribution unit 47, which is configured to send a control signal under pressure to the hydraulic jack 27 based on the sum of the instantaneous operating pressures of the front hydraulic cylinders 12 of the right-hand front row 15 and of the front hydraulic cylinders 12 of the left-hand front row 16.

With reference to FIG. 1, the hydraulic unit 47 comprises two double-acting hydraulic cylinders indicated as 48 and 49. The cylinders 48 and 49 have respective liners 50 fixed relative to each other and, conveniently, firmly connected to each other, and respective pistons 51 and 52 having, in the described example, the same thrust surface.

Alternatively, the pistons 51 and 52 have different thrust surfaces.

The pistons 51 and 52 are slidable inside the respective liners 50 and are firmly connected to a common free rod 53 passing through both liners 50. The piston 51 divides the space inside the respective liner into two chambers, indicated as 54 and 55. The chamber 54 is hydraulically connected to the hydraulic cylinders 21 of the bogies 12 of the left-hand row 16 of front bogies, by means of a pipe 56. On the other hand, the chamber 55 is hydraulically connected to the hydraulic jacks 27 for actuating the arm 24 through a pipe 57.

The piston 52 divides, instead, the space inside the respective liner 50 thereby delimiting two variable-volume chambers, indicated as 58 and 59. The chamber 58 is hydraulically connected to the hydraulic cylinders 21 of the bogies 12 of the right-hand row 15 of front bogies through a pipe 60, while the chamber 59 is connected to the hydraulic jack 27 for actuating the arm, again by means of the pipe 57. The chambers 55 and 59, therefore, communicate directly with each other through the pipe 57.

When in use, the hydraulic circuit 30 allows to obtain a semi-trailer, which allows the transport of the load, for example the wind turbine blade 2, with a load bearing on five bearing points, but always in isostatic conditions and therefore with limited torsions not only of the two modules 6 and 7 but also of the intermediate structure 8. At the same time, the semi-trailer 1 described above has an excellent resistance to the lateral rollover moments transmitted from the load, especially when a load is transferred having a centre of gravity strongly elevated with respect to the load plane, as during the transfer of the wind turbine blade 2. In this case, in fact, due to the tipping of the blade 2 in order to overcome obstacles on its path, the centre of gravity G of the same blade 2 passes from a height of three-four meters as the blade is lying horizontally, up to twenty-twenty-five meters when the blade reaches a condition of substantial verticality.

In addition thereto, the described semi-trailer 4 ensures high lateral rollover resistance even if, during transport, the centre of gravity G is moved longitudinally from and toward the tractor 3, which is the case during the tipping of the wind turbine blade 2 toward its position of substantial verticality.

Figure 3:
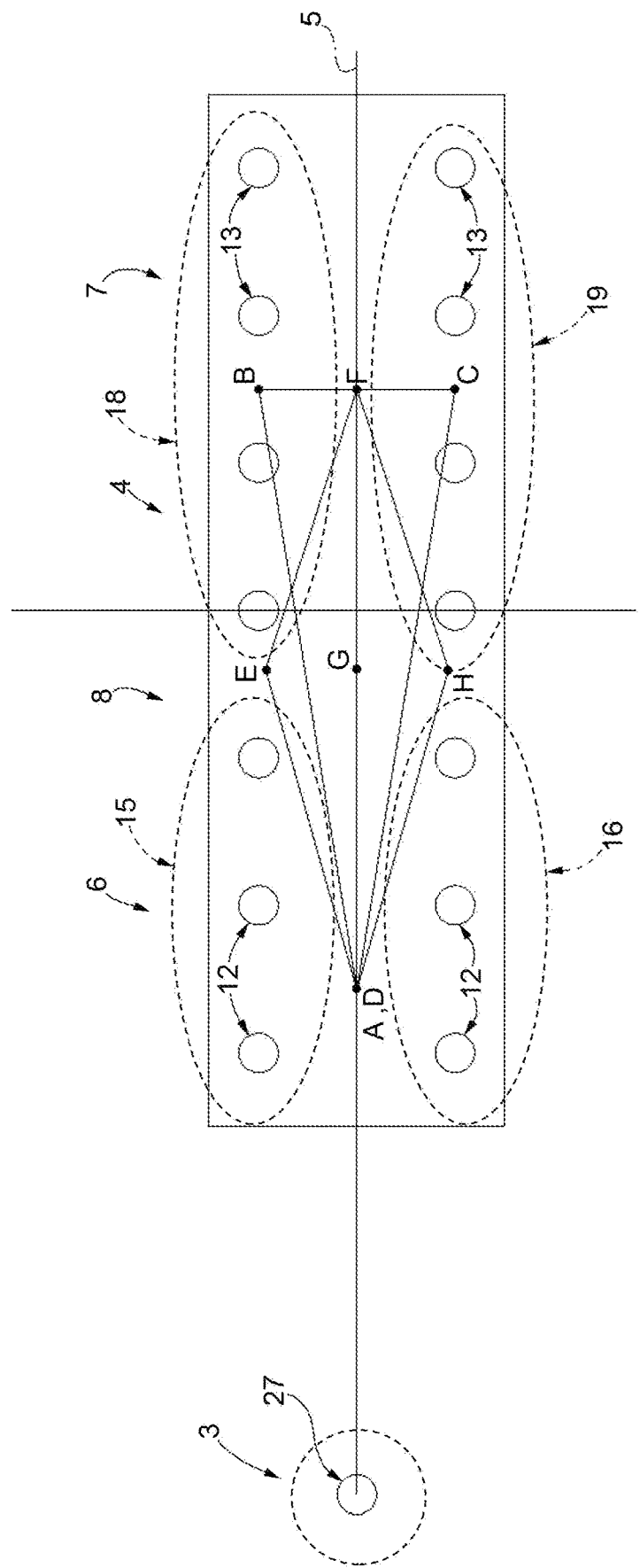
FIG. 3 shows schematically a diagram illustrating the isostatic stability of the semi-trailer of FIGS. 1 and 2, compared with a diagram illustrating the stability of a standard semi-trailer.

The foregoing is due to the synergy between the hydraulic unit 31 and the hydraulic unit 47, graphically confirmed by FIG. 3. With reference to FIG. 3, in which the front 6 and rear modules 7 and the respective bogies 12 and 13 are schematically illustrated, the triangle with vertices A,B,C, delimits the area of isostatic stability of a traditional semi-trailer with three bearing points. The stability of the transport is ensured when the centre of gravity G of the transported load falls within the triangle ABC. In these conditions it is obvious how rollover stability decreases as the centre of gravity G moves toward the vertex A and how the lateral rollover pairs are absorbed mainly by the rear module.

Always in FIG. 3, the rhombus DEFH delimits, instead, the area the isostatic stability of the semi-trailer 4 according to the invention. As is immediately detectable, at least at the intermediate structure 8 where the load is located, the size of the area of stability in a direction orthogonal to the longitudinal direction 5 or in the forward direction of the vehicle increases with respect to the triangle ABC and therefore the stability to lateral rollover increases, too. Furthermore, from the same diagram, it is immediately visible that the stability to lateral rollover increases at the intermediate structure 8 and as the centre of gravity G moves toward the vertex D; this is very important, since the movement in such direction occurs during the lifting of the blade 2 toward its condition of substantial verticality. It is therefore evident that the semi-trailer 4 according to the invention has a high dynamic stability and especially high resistance to lateral rollover both when the centre of gravity G of the load is arranged in a position which is strongly elevated with respect to the load planes, and when the centre of gravity G translates longitudinally from and toward the tractor 3, as during the tipping of the wind turbine blade 2 when supported with the intermediate structure 8.

Figure 4:
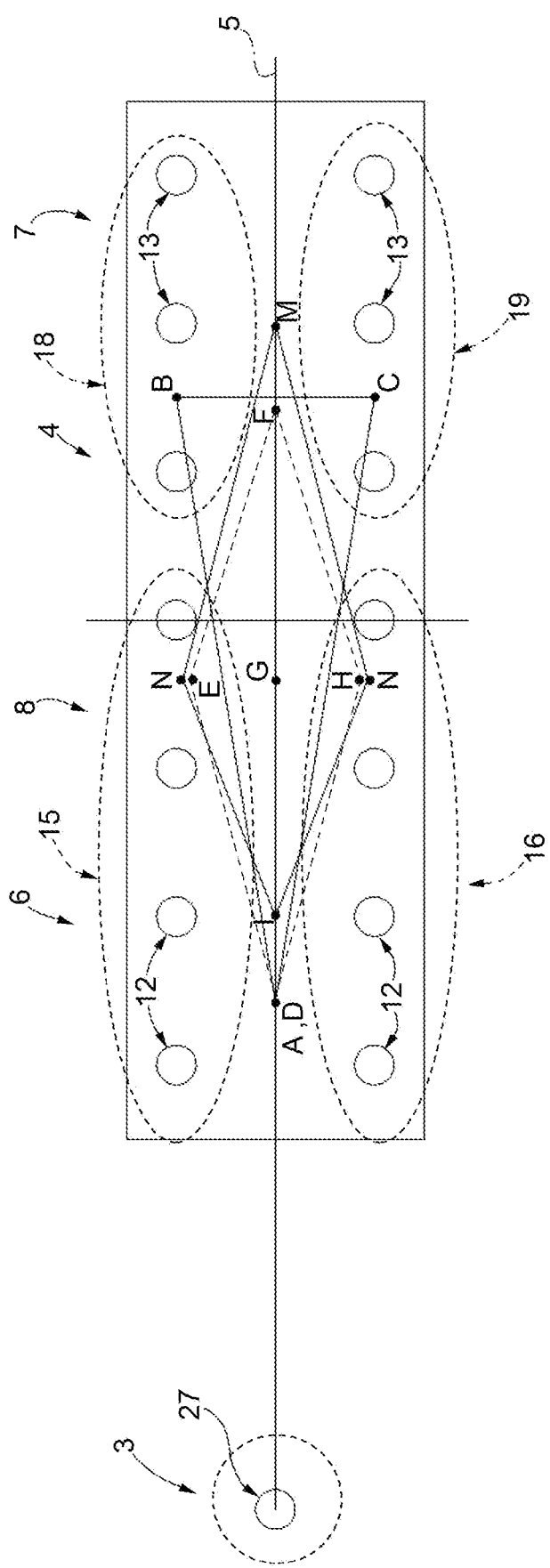
FIG. 4 is similar to FIG. 3, and shows the stability diagram of a different embodiment of the semi-trailer in FIG. 1.

In FIG. 4, the rhombus ILMN represents, on the contrary, the area of isostatic stability of a semi-trailer 4' made according to the invention, which differs from the semi-trailer 4 because its front module 6 has a number of bogies 12 which is greater than the number of bogies 13 of its rear module 7. Also in FIG. 4, the modules 6,7 and the bogies 12,13 are schematically illustrated. From the comparison of the areas and the relative longitudinal position of the two rhombuses DEFH and ILMN, it can be seen how the transverse dimension of the area of stability, i.e. the resistance to lateral rollover is, in this case, increased with respect to the solution with modules 6,7 having the same number of bogies 12,13 and grows as the centre of gravity G moves along the intermediate structure 8 and toward the tractor 3.

Still with reference to FIGS. 3 and 4, areas of stability can still be modified by varying the pistons sections of the hydraulic distribution units 31,47.

From the above description, it is clear that modifications and variations may be made to the hydraulic circuit 30 described herein without departing from the scope defined in the independent claim. In particular, it is evident how the cylinders 32 and 33 of the hydraulic unit 31 and/or the cylinders 49 and 49 of the hydraulic unit 47 can be replaced by equivalent rotating hydraulic actuators, for example hydraulic motors having rotating shafts coupled together in an angularly fixed manner, for example by means of a toothed gear transmission. Substantially, in this variation, the hydraulic translation is replaced with a hydraulic rotation and the hydraulic motors allow the hydraulic thrusts received from the corresponding bearing points to be transformed into twisting moments.

The invention claimed is:

1. A semi-trailer for transporting a load to be moved and having its own longitudinal axis; the semi-trailer comprising:
   a front wheeled module comprising a right-hand front row and a left-hand front row of front bogies, each provided with its own hydraulic cylinder for actuating a respective hydraulic suspension;
   a rear wheeled module comprising a right-hand rear row and a left-hand rear row of rear bogies, each provided with a respective hydraulic cylinder for actuating a corresponding hydraulic suspension;
   a coupling unit for coupling the front wheeled module to a tractor and comprising at least one hydraulic jack for transferring part of the load to be moved to the tractor; and
   a hydraulic circuit for connecting and controlling said hydraulic cylinders; said hydraulic circuit comprising a first hydraulic distribution unit interposed between the hydraulic cylinders of the front and rear rows of bogies and configured in such a way that the sum of the instantaneous load-supporting pressures acting on the cylinders of the right-hand front row and the cylinders of said left-hand rear row is equal to the sum of the instantaneous pressures controlling the cylinders of the left-hand front row and the cylinders of the right-hand rear row, wherein said hydraulic circuit also comprises a second hydraulic distribution unit; said second hydraulic unit being configured to send to said hydraulic jack a pressure signal based on the sum of the instantaneous load-supporting pressures acting on the hydraulic cylinders of said right-hand front row and of said left-hand front row;
   wherein said second hydraulic unit comprises a first and a second double-acting hydraulic member having respective movable members firmly connected to each other; the movable member of said first hydraulic member separating two first variable-volume chambers from one another and the movable member of said second hydraulic member separating two second variable-volume chambers from one another; one of said first chambers being hydraulically connected to the hydraulic cylinders of said right-hand front row of front bogies, and the other to said hydraulic jack; one of said second chambers being hydraulically connected to the hydraulic cylinders of said left-hand front row, and the other to said hydraulic jack.

2. The semi-trailer according to claim 1, wherein said movable members have the same thrust surface.

3. The semi-trailer according to claim 1, wherein at least one of said movable members can translate or rotate.

4. The semi-trailer according to claim 1, wherein said first and second hydraulic units are constructionally identical to each other.

5. The semi-trailer according to claim 1, wherein a number of said front bogies of the front module is greater than a number of rear bogies of the rear module.

6. The semi-trailer according to claim 1, wherein said first hydraulic distribution unit comprises a double-acting front hydraulic member having two variable-volume chambers, one of which is hydraulically connected to the hydraulic cylinders of said right-hand front row and the other to the hydraulic cylinders of said left-hand front row; and a double-acting rear hydraulic member having two further variable-volume chambers, one of which is hydraulically connected to the hydraulic cylinders of said right-hand rear row, and the other to the hydraulic cylinders of said left-hand rear row; said movable members being firmly connected to each other.

7. The semi-trailer according to claim 1, further comprising an intermediate bridge structure connecting the front and rear wheeled modules to each other and defining a plane for supporting the load to be moved; said intermediate structure being devoid of bogies.

8. A vehicle for the transport of goods, the vehicle comprising a tractor and a semi-trailer connected to the tractor, wherein the semi-trailer is according to claim 1.

* * * * *